United States Patent [19]

Matsuzaki et al.

[11] Patent Number: 4,781,264
[45] Date of Patent: Nov. 1, 1988

[54] MOTOR VEHICLE WITH RIDING SADDLE AND HORIZONTALLY DISPOSED CUSHIONING UNIT

[75] Inventors: Akio Matsuzaki; Mamoru Isomura; Kazutoshi Nakano; Toshiya Katami, all of Saitama, Japan

[73] Assignee: Honda Giken Kogyo Kabushiki Kaisha, Tokyo, Japan

[21] Appl. No.: 787,265

[22] Filed: Oct. 15, 1985

[30] Foreign Application Priority Data

| Oct. 12, 1984 [JP] | Japan | 59-214708 |
| Oct. 12, 1984 [JP] | Japan | 59-214709 |
| Oct. 12, 1984 [JP] | Japan | 59-214710 |
| Oct. 12, 1984 [JP] | Japan | 59-214711 |
| Oct. 12, 1984 [JP] | Japan | 59-214712 |
| Oct. 12, 1984 [JP] | Japan | 59-214707 |

[51] Int. Cl.$^4$ .............. B60K 13/02; B60K 3/14; B60K 19/02; B60K 25/26
[52] U.S. Cl. .................. 180/219; 180/68.3; 180/227; 180/229; 280/281 B; 280/284; 296/78.1; 296/208
[58] Field of Search .............. 180/227, 219, 229, 68.3; 280/284, 285, 281 B; 296/208, 78.1

[56] References Cited

U.S. PATENT DOCUMENTS

| 2,164,413 | 7/1939 | Kuehn | 280/28 J |
| 3,542,146 | 11/1970 | Hooper et al. | 180/227 X |
| 3,948,543 | 4/1976 | MacDonald et al. | 280/284 |
| 4,396,084 | 8/1983 | Yoshimura et al. | 180/219 |
| 4,511,013 | 4/1985 | Miyakoshi et al. | 280/284 X |
| 4,570,740 | 2/1986 | Hara | 180/229 |
| 4,582,157 | 4/1986 | Watanabe | 180/217 |
| 4,643,964 | 8/1984 | Takayanagi et al. | 180/227 X |

FOREIGN PATENT DOCUMENTS

| 89423 | 5/1983 | Japan | 180/219 |
| 128923 | 8/1983 | Japan | 180/229 |
| 345502 | 5/1960 | Switzerland | 280/285 |

*Primary Examiner*—John J. Love
*Assistant Examiner*—Mitchell J. Hill
*Attorney, Agent, or Firm*—Irving M. Weiner; Joseph P. Carrier; Pamela S. Burt

[57] ABSTRACT

A motor vehicle with a riding saddle includes front and rear wheels, an engine, a front wheel steering device for steering the front wheel, a frame having an integral head pipe supporting the front wheel steering device, a rear fork having a front end pivotally mounted on the frame and a rear end supporting the rear wheel, and a cushioning unit having a front end pivotally coupled to the frame and a rear end coupled to the rear fork for relative angular movement. The cushioning unit extends substantially parallel to a longitudinal central axis of the motor vehicle an is displaced laterally from the longitudinal central axis, leaving a space on one side of the cushioning unit. The motor vehicle also includes accessories disposed in the space on one side of the cushioning unit. The frame includes main and down tubes extending downwardly and rearwardly from the upper and lower portions, respectively, of the head pipe. Each of the main and down tubes is composed of a pair of laterally spaced members.

5 Claims, 6 Drawing Sheets

MOTOR VEHICLE WITH RIDING SADDLE AND HORIZONTALLY DISPOSED CUSHIONING UNIT

BACKGROUND OF THE INVENTION

1. Field of the Invention

The present invention relates to a motor vehicle with a riding saddle, and more particularly to a motor vehicle such as a motorcyle, or a three- or four-wheeled motor vehicle with a riding saddle for use in trail riding.

2. Description of Relevant Art

One known motor vehicle with a riding saddle for use in trail riding is disclosed in Japanese Utility Model Preliminary Publication No. 56-135386. The disclosed motor vehicle has a minimum height from ground which is larger than that of general motorcycles to prevent the vehicle bottom from touching ground surfaces of rough terrain. The motor vehicle also has a rider's seat or saddle and various accessories attached at a low height to keep the center of gravity of the vehicle body low for intended easier vehicle control.

In the above conventional motor vehicle design, a rear wheel damper is positioned in a dead space near the engine and extends substantially horizontally on a longitudinal central line of the motor vehicle, thus achieving the aforesaid advantages. However, where the rear wheel damper is disposed on the longitudinal central line, accessories such as an air cleaner, the prechamber of an exhaust pipe and the like are required to project above or laterally of the rear wheel damper. This arrangement fails to lower the center of gravity of the vehicle body sufficiently, and also to reduce the width of the vehicle body.

Generally, the frame structure of motorcycles includes a single main tube extending rearwardly from a head pipe at its center across the width thereof. The main tube is required to extend through a position sufficiently spaced upwardly from the engine so as not to interfere with the carburetor connected to the upper portion of the engine. A connecting tube by which the carburetor and an air cleaner case disposed behind the carburetor are interconnected is also required to lie outwardly and laterally of the vehicle body since the main pipe has a rear end directed downwardly at a large angle and positioned at the center across the width of the vehicle body. This arrangement of the main tube and the connecting tube thereby imposes a limitation on the lowering of the center of gravity of the vehicle body and the reduction of the width of the vehicle body.

The present invention has been made in an effort to solve the aforesaid problems of the conventional motor vehicle with a riding saddle.

SUMMARY OF THE INVENTION

It is an object of the present invention to provide a motor vehicle with a riding saddle, having a main tube disposed at a reduced height, a driver's seat lying in a low position, and accessories collectively at the center across the width of the vehicle in a low position, so that the motor vehicle has as low a center of gravity and as small a width as possible while maintaining a required minimum height from ground.

According to the present invention, the above object can be achieved by a motor vehicle with a riding saddle, comprising front and rear wheels, a front wheel steering device for steering the front wheel, a frame having an integral head pipe supporting the front wheel steering device for angular movement, an engine fixed to the frame, the frame and the engine constituting a rigid structural body, a rear fork having a front end pivotally mounted on the frame and a rear end supporting the rear wheel, a cushioning unit having a front end pivotally coupled to the rigid structural body and a rear end coupled to the rear fork for relative angular movement, the cushioning unit extending substantially parallel to a longitudinal central axis of the motor vehicle and being displaced laterally from the longitudinal central axis, leaving a space on one side of the cushioning unit, and accessory means disposed in the space.

The frame comprises a main tube extending downwardly and rearwardly from an upper portion of the head pipe, and a down tube disposed below the main tube and extending downwardly and rearwardly from a lower portion of the head pipe, each of the main and down tubes being composed of a pair of laterally spaced members.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
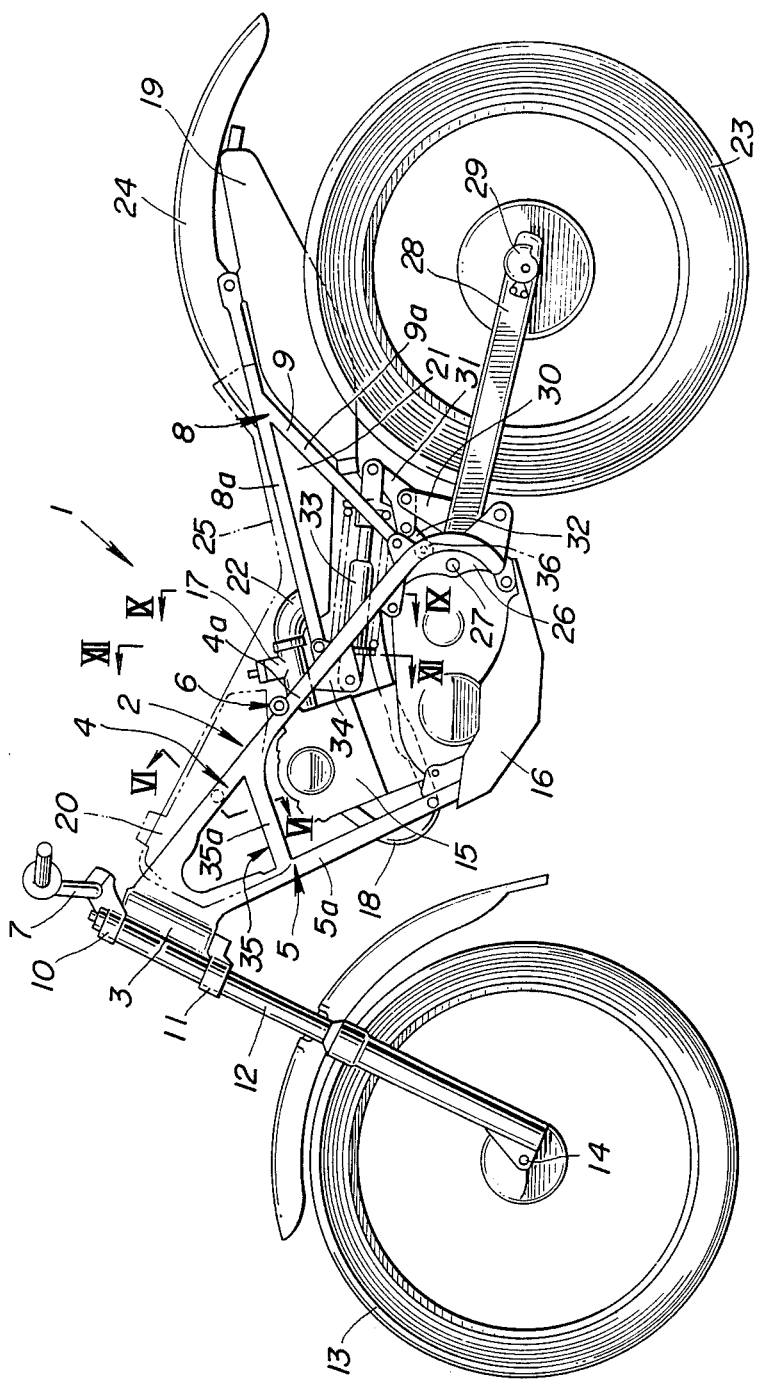
FIG. 1 is a side elevational view of a motorcycle as an example of a motor vehicle with a riding saddle according to the present invention.

As shown in FIG. 1, a motorcycle 1 has a frame 2 including a head pipe 3, a main tube 4 exteding from the upper end of the head pipe 3 obliquely downwardly and rearwardly, and a down tube 5 extending from the lower end of the head pipe 3 obliquely downwardly and rearwardly. The main tube 4 comprises a pair of laterally spaced members 4a, 4a (FIGS. 2 and 3) joined together by the head pipe 3 and extending progressively away from each other downwardly. The members 4a, 4a have lower end portions curved forwardly. The down tube 5 also comprises a pair of laterally spaced members 5a, 5a (FIG. 3) joined together by the head pipe 3 and extending progressively away from each other downwardly. These four tube members 4a, 5a jointly defined therebetween a space substantially in the form of a quadrangular prism.

As shown in FIG. 1, the frame 2 also includes an upper cross member 6 extending between the main tube members 4a, 4a and a lower cross member 36 extending between the main tube members 4a, 4a. A side tube 35 is joined between the main tube members 4a, 4a and the down tube members 5a, 5a.

Figure 4:
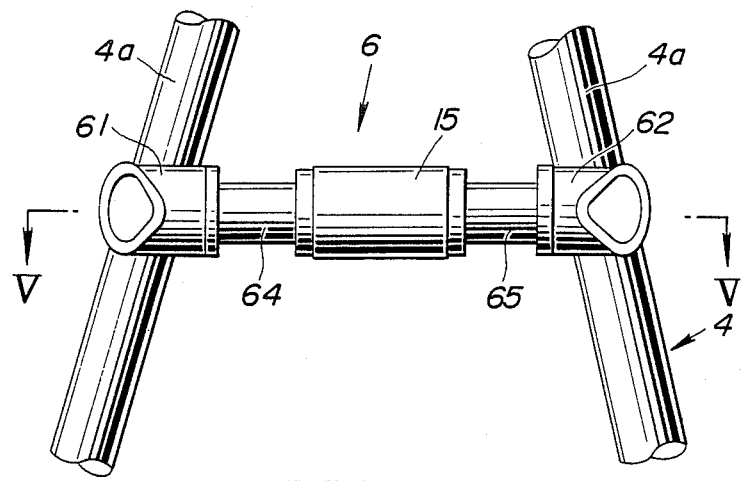
FIG. 4 is an enlarged rear elevational view of an upper cross member.
Figure 5:
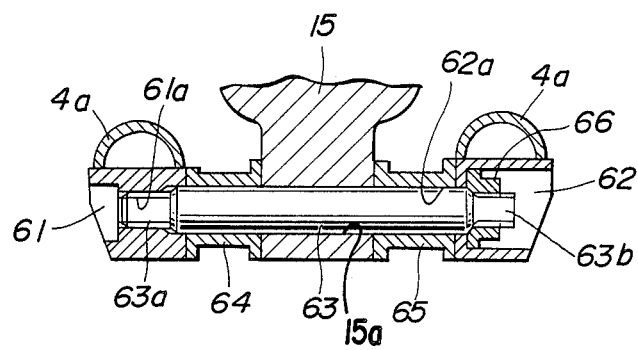
FIG. 5 is a cross-sectional view taken along line V—V of FIG. 4.

As illustrated in FIGS. 4 and 5, the upper cross member 6 is composed of pipes 61, 62 fixed to the members 4a, 4a, respectively, and opening obliquely rearwardly. One of the pipes 61 has a threaded hole 61a, and the other pipe 62 has an insertion hole 62a for passage of a hanger bolt 63 therethrough. An engine 15 is supported by the upper cross member 6 by inserting the hanger bolt 63 through an attachment hole 15a of the engine 15, placing collars 64, 65 on the hanger bolt 63, then threading an externally threaded end 63a of the hanger bolt 63 into the threaded hole 61a, and threading a nut 66 over the externally threaded opposite end 63b of the hanger bolt 63. The engine 15 can easily be dismounted from the frame 2 by loosening the nut 66 and pulling out the hanger bolt 63.

Figure 2:
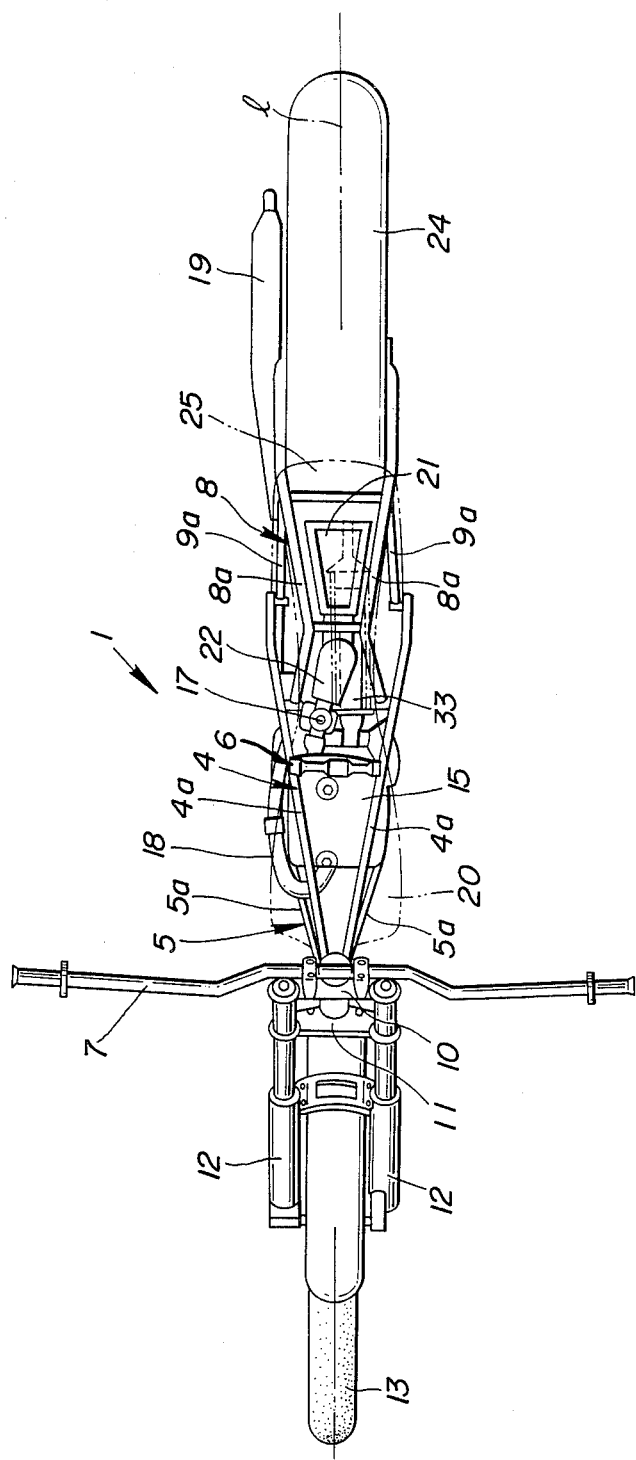
FIG. 2 is a plan view of the motorcycle of FIG. 1.
Figure 3:
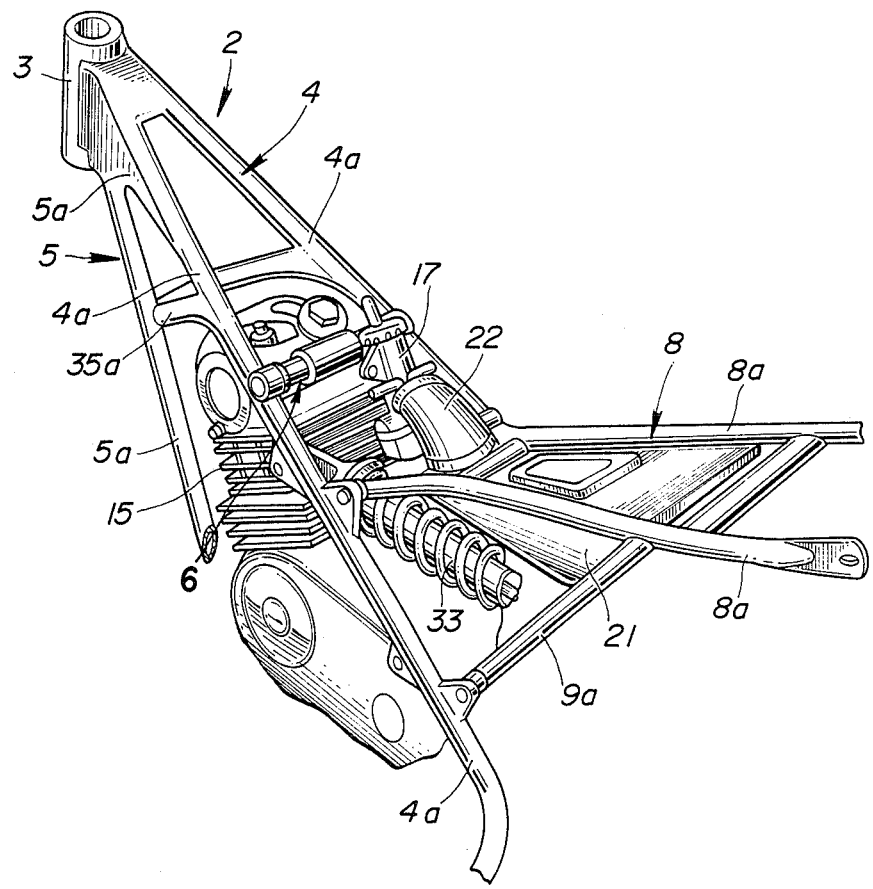
FIG. 3 is a fragmentary perspective view of a frame.

As shown in FIGS. 2 and 3, a seat frame 8 extends obliquely upwardly and rearwardly from an intermediate portion of the main tube 4. The main tube 4 and the seat frame 8 jointly assume a V shape when seen in side elevation. The seat frame 8 is composed of a pair of laterally space members 8a, 8a having front ends coupled to the main tube members 4a, 4a, respectively. The front portions of the seat frame members 8a, 8a are bent inwardly toward each other for contact with the knees of the rider when the rider is seated on the driver's seat or saddle.

A back pipe 9 is joined obliquely between an intermediate portion of the seat frame 8 and the main tube 4. The back pipe 9 comprises a pair of laterally spaced members 9a, 9a.

Each of the members of the main tube 4, the down tube 5, the side tube 35, the seat frame 8, and the back pipe 9 is preferably in the form of a tube having an elliptical cross section with its horizontal dimension smaller than its vertical dimension. Therefore, these tube members are of increased vertical rigidity, and reduce the entire width of the motorcycle.

As shown in FIGS. 1 and 2, the upper and lower ends of the head pipe 3 are attached to upper and lower bridges 10, 11, respectively. The upper bridge 10 is coupled to a handle pipe 7 at its center. Between the upper and lower bridges 10, 11, there are supported the upper ends of a pair of laterally spaced front fork members 12, 12 which support the axle 14 of a front wheel 13 rotatably on the lower ends thereof.

In FIG. 3, the engine 15 is positioned in the space defined between the main tube 4 and the down tube 5, and supported by brackets attached to the main and down tubes 4, 5. As described above, the upper end of the engine 15 is supported directly by the upper cross member 6. The lower portion of the engine 15 is covered with a cover 16 (FIG. 1) attached to and between the lower ends of the main and down tubes 4, 5 for protection against collision with ground surfaces. The cover 16 is made of an aluminum alloy or a magnesium alloy.

Figure 7:
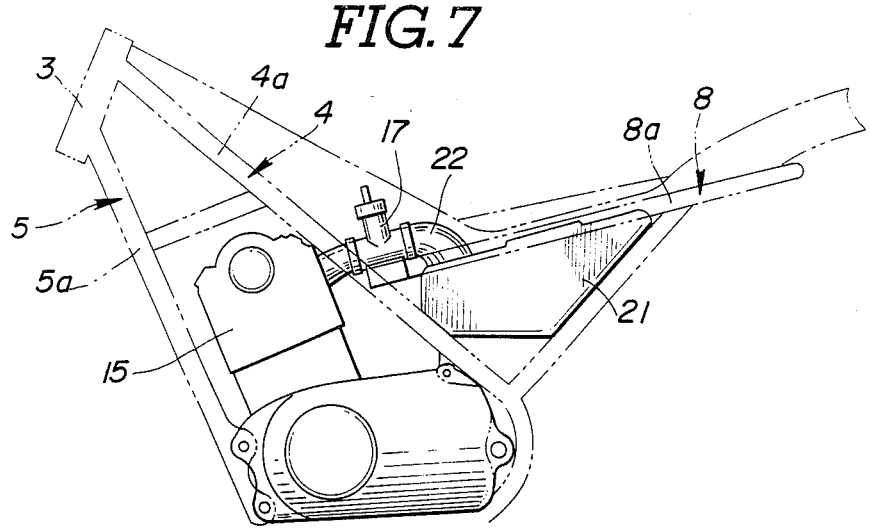
FIG. 7 is a fragmentary side elevational view showing the positional relationship of an engine, accessories, and the frame.
Figure 8:
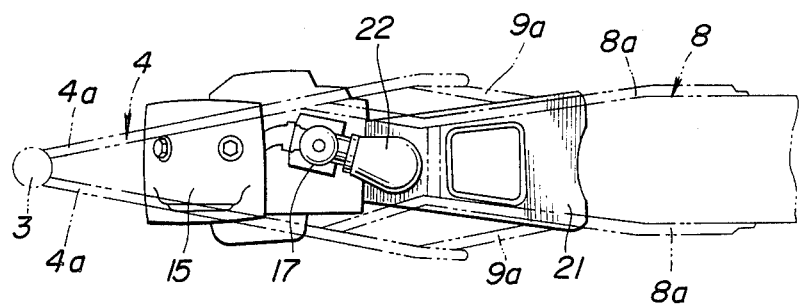
FIG. 8 is a fragmentary plan view showing the positional relationship of the engine, accessories, and the frame.

A carburetor 17 is attached to the upper back of the engine 15. The carburetor 17 projects rearwardly and upwardly of the main tube 4, as shown in FIG. 7, and is disposed between the main tube members 4a, 4a, as shown in FIG. 8. An exhaust pipe 18 (FIG. 1) extends from the lower front surface of the engine 15 and is curved around the front end of the engine 15. The exhaust pipe 18 extends along the righthand side of the motorcycle and is connected to a muffler 19.

Figure 6:
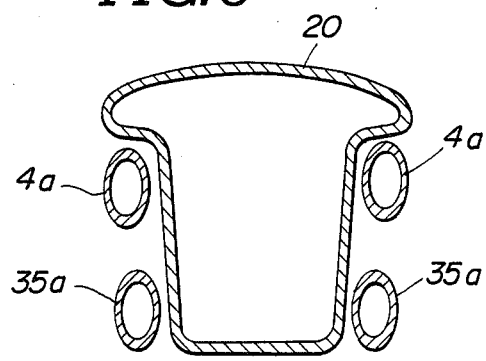
FIG. 6 is a cross-sectional view taken along line VI—VI of FIG. 1.

As shown in FIG. 6, a fuel tank 20 is disposed between the main tube members 4a, 4a, the down tube members 5a, 5a, and side tube members 35a, 35a of the side tube 35. An air cleaner case 21 having its upper surface slanted along the seat frame 8 is disposed below the seat frame members 8a, 8a, as shown in FIGS. 1 and 7. A connecting tube 22 extends from the upper front portion of the air cleaner case 21 to the carburetor 17. As illustrated in FIGS. 7 and 8, the connecting tube 22 is located between the seat frame members 8a, 8a and projects upwardly beyond the seat frame members 8a, 8a.

In FIG. 1 and 2, a rear fender 24 is fixed to the seat frame 8 in covering relation to the upper portion of a rear wheel 23. A body cover 25 is attached to the seat frame 8 and the main tube 2 in covering relation to the upper surface of the fuel tank 20, the upper surface of the air cleaner case 21, and the front surface of the rear fender 24. The body cover 25 has a rider's seat or saddle attached to the upper surface thereof. The body cover 25 is substantially V-shaped in side elevation with its valley portion positioned for contact with the rider's knees. The valley portion of the body cover 25 is constricted inwardly into conformity with the inwardly bent portions of the seat frame members 8a, 8a. The projecting portion of the connecting tube 22 is positioned in an upwardly inclined portion of the body cover 25 in front of the valley portion thereof for lowering the position in which the rider is seated.

As shown in FIG. 1, a pivot shaft 27 extends through gusset plates 26 attached to the lower ends of the main tube members 4a, 4a. The front end of a rear fork 28 is vertically angularly movably mounted on the pivot shaft 27. The rear wheel 23 is rotatably supported on the rear end of the rear fork 28. The rear fork 28 supports on its rear end a cam mechanism 29 for adjusting the tension of a rear wheel driving chain (not shown).

Figure 9:
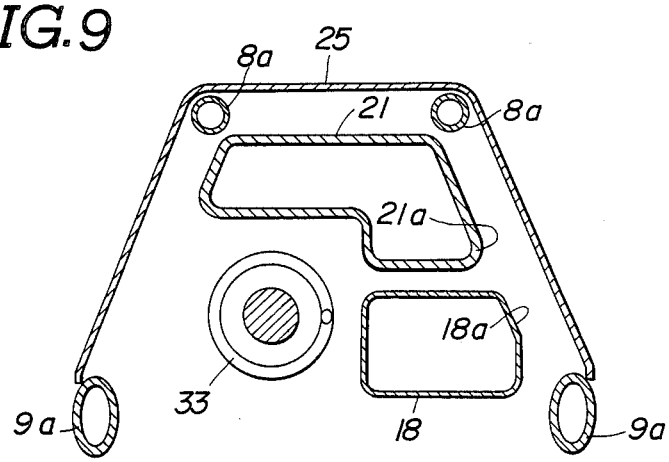
FIG. 9 is an enlarged cross-sectional view taken along line IX—IX of FIG. 1.

An upward projection 30 is attached to the front end of the rear fork 28. An arm 31 is pivotally mounted in its intermediate portion on the upward projection 30, the arm 31 having an end pivotally supported on a bracket 32 secured to the frame 2. A damper or rear cushioning unit 33 has a rear end pivotally coupled to the other end of the arm 31. The rear cushioning unit 33 is disposed below the rider's seat and vertically between the carburetor 17, the air cleaner case 21, and the engine crankcase. The rear cushioning unit 33 lies horizontally substantially parallel to the longitudinal central axis l (FIG. 2) of the motorcycle. The rear cushioning unit 33 has a front end pivotally coupled to a bracket 34 fixed to the lefthand main tube member 4a. As shown in FIGS. 2 and 9, the rear cushioning unit 33 is displaced or offset to the left from the longitudinal central axis l, thus leaving a space on the righthand side of the rear cushioning unit 33. The air cleaner case 21 has a portion extending into this space, and the prechamber 18a of the exhaust pipe 18 is located in the space below the portion of the air cleaner case 21, the rear cushioning unit 33 being positioned vertically between the rider's seat and the crankcase. Therefore, the dead space can be effectively utilized. With this layout, the minimum height of the motorcycle from ground is maintained while the height of the rider's seat is lowered, the width of the motorcycle where the rider is seated is reduced and the air cleaner, the carburetor, and the exhaust device are allowed to function satisfactorily.

The line interconnecting the opposite ends of the arm 31 and the longitudinal central line of the rear fork 28 form an angle therebetween which is 90° or smaller When the rear fork 28 is angularly moved counterclockwise (FIG. 1) in the event that the rear wheel 23 rides on a bump while motorcycle 1 is running, the arm 31 is also turned counterclockwise. The forward displacement of the end of the arm 31 which is coupled to the rear end of the rear cushioning unit 33 is relatively small when the rear fork 28 starts being angularly moved upwardly. As the angular upward movement of the rear fork 28 is increased, the forward displacement of the end of the arm 31 is also increased. Consequently, the rear cushioning unit 33 can absorb the energy of a shock imposed on the rear wheel 23 at a rate commensurate with the magnitude of the shock energy.

Figure 10:
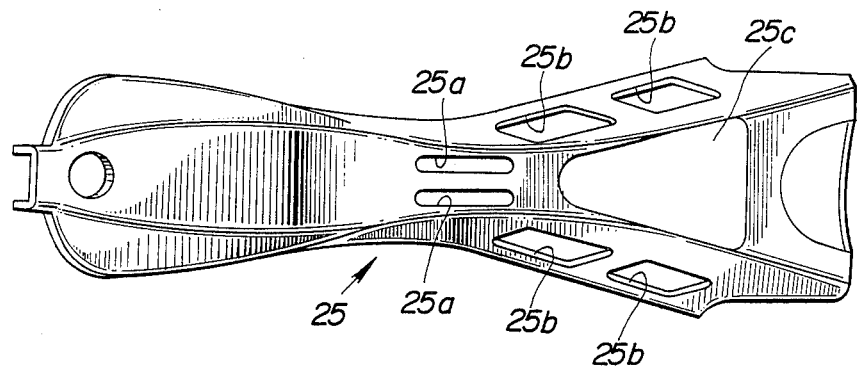
FIG. 10 is a plan view of a vehicle body cover.
Figure 11:
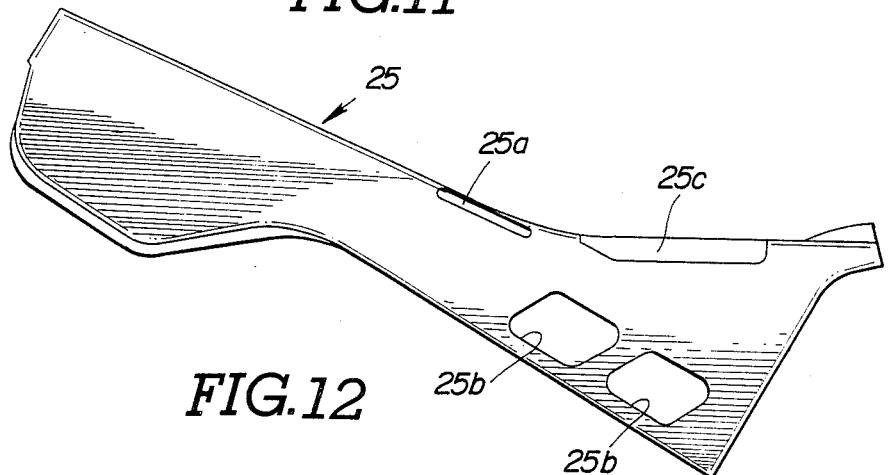
FIG. 11 is a side elevational view of the vehicle body cover.
Figure 12:
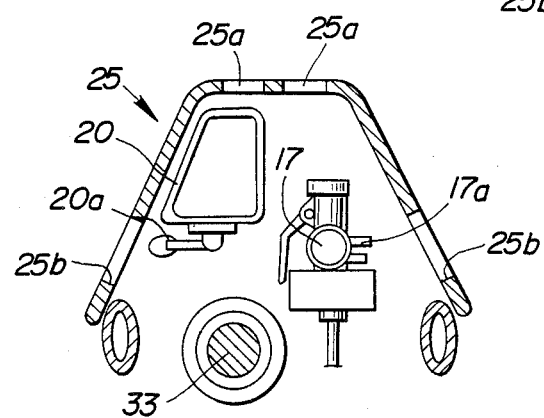
FIG. 12 is an enlarged cross-sectional view taken along line XII—XII o FIG. 1.

FIGS. 10 through 12 illustrate the body cover 25 in detail. The body cover 25 which is V-shaped in side elevation has a front portion inclined upwardly in the forward direction and a rear portion inclined upwardly in the rearward direction. The V-shaped valley portion is constricted inwardly, as described above, and has two slots 25a, 25a defined in its upper wall parallel to each other. The rear portion of the body cover 25 includes two opposite side walls each having two openings 25b, 25b spaced in the longitudinal direction.

As shown in FIG. 12, one of the openings 25b in one of the side walls is defined laterally of a fuel cock 20a on the lower side of the fuel tank 20, and one of the openings 25b in the other side walls is defined laterally of an air screw adjustment knob 17a of the carburetor 17. Therefore, the cock 20a and the knob 17a can easily be accessed by fingers through these openings 25b.

The upper wall of the rear portion of the body cover 25 has the rider's seat 25c integrally formed therewith.

The carburetor 17, the rear cushioning unit 33, and the exhaust device are covered by the body cover 25 such that they are exposed to and cooled by a flow of fresh cooling air introduced into the body cover 25 through the openings 25b and discharged out of the body cover 25 through the slots 25a.

With the arrangement of the present invention, the rear cushioning unit 33 is disposed horizontally substantially parallel to the longitudinal central axis of the motocycle, and is offset laterally from the longitudinal central axis of the motorcycle. Therefore, the accessories such as the air cleaner case, the carburetor, and the prechamber of the exhaust pipe can be positioned in the space defined on one side of the rear cushioning unit, and hence assembled in the vicinity of the center of gravity of the motorcycle. This layout keeps the motorcycle in good weight balance and reduces the width of the motorcycle since the accessories do not project laterally of the motorcycle.

Since the main tube is composed of a pair of laterally spaced members, it can be positioned in the vicinity of the upper portion of the engine, i.e., at a position lower than the conventional main tube found in known motorcycles. As a result, the rear frame connected to the main tube can be lowered as well as the rider's seat and the air cleaner case. The center of gravity of the motorcycle can therefore be lowered while maintaining a desired minimum height from the ground. Furthermore, the upper portion of the engine is supported directly on the cross member between the main tube members. The cross member thus serves to support the engine as well as to increase the rigidity of the frame, with the result that the number of frame parts can be reduced.

The cross member includes a hanger bolt which can be attached to and detached from the main tube members, so that the engine can be installed and dismounted easily as desired for maintenance and the surroundings of the engine can also easily be serviced.

Each of the frame tube members is in the form of a pipe or tube having an elliptical cross section with its horizontal dimension smaller than its vertical dimension. These tube members can provide a larger space between frame tube members than round frame pipes or tubes which give the same vertical rigidity and mechanical strength to the frame. Therefore, the fuel storage capacity of the fuel tank can be increased, and the fuel tank, the carburetor, and the rear cushioning unit can conveniently be laid out in such a large space. The tube members of the invention also allow the width of the frame to be reduced for better motorcycle maneuverability. The portions of the seat frame members against which the rider's knees are held are bent inwardly, while giving the rider's seat a required riding area. This seat frame construction allows the rider to grip the rider's seat strongly with the knees, thus making the motorcycle highly suitable for use in trail riding.

The connecting tube 27 extends from the upper wall of the air cleaner case 21. Therefore, water which may be trapped in the air cleaner case is prevented from adversely affecting the carburetor 17, this being possible without adding any special water drain device to the air cleaner case. The carburetor and the connecting tube project upwardly beyond the junction between the main tube and the seat frame, and hence can well be serviced. This arrangement also serves to reduce the width of the motorcycle.

The upper side of the engine and the upper and lateral sides of the air cleaner case and the carburetor are covered with the body cover. The upper slots defined in the body cover allow heated air to be discharged upwardly from the engine and the exhaust device, and the upward draft of heated air results in a chimney effect to draw fresh air into the body cover through the side openings therein for positively cooling the engine and the exhaust device.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:
1. A motor vehicle with a riding saddle, comprising:
a front wheel and a rear wheel;
a front wheel steering device for steering said front wheel;
a frame having an integral head pipe supporting said front wheel steering device for angular movement;
an engine fixed to said frame, said frame and said engine constituting a rigid structural body;
a rear fork having a front end pivotally mounted on said frame and a rear end supporting said rear wheel;

a cushioning unit having a front end pivotally coupled to said rigid structural body and a rear end coupled to said rear fork for relative angular movement, said cushioning unit extending substantially parallel to a longitudinal central axis of the motor vehicle and being displaced laterally from said longitudinal central axis, leaving a space on one side of said cushioning unit; and accessory means disposed in said space;

said frame comprise a main tube extending downwardly and rearwardly from an upper portion of said head pipe, a down tube disposed below said main tube and extending downwardly and rearwardly from a lower portion of said head pipe, each of said main down tubes being composed of a pair of laterally spaced members, and a seat frame extending rearwardly from an intermediate portion of said main tube;

said seat frame comprising a pair of laterally spaced members connected to said laterally spaced members, respectively, of said main tube in a V-shape when seen in side elevation; and said accessory means including an air cleaner case disposed below said seat frame and having an upper surface slanted along said seat frame, a prechamber of an exhaust pipe disposed below said air cleaner case, a connecting tube extending from an upper front portion of said air cleaner case, and a carburetor disposed between said laterally spaced members of the main tube, said connecting tube being connected to said carburetor, said connecting tube and said carburetor being positioned above a junction of said laterally spaced members of the main tube and said laterally spaced members of the seat frame.

2. A motor vehicle according to claim 1, wherein:
said frame also includes a cross member extending between said laterally spaced members of said main tube, said engine being disposed in a space defined between said laterally spaced members of the main tube and said laterally spaced members of the down tube and having an upper portion supported by said cross member.

3. A motor vehicle according to claim 2, wherein:
each of said laterally spaced members of the main and down tubes comprising a tube having an elliptical cross section with its horizontal dimension smaller than its vertical dimension.

4. A motor vehicle according to claim 1, further including a body cover supported on said frame, said body cover comprising an upper wall and a pair of side walls which substantially cover the upper side of said engine and upper and lateral sides of said cushioning unit and said accessory means, said engine having an exhaust device, said upper wall of said body cover having a first opening for upwardly discharging heated air from said engine and said exhaust device, said side walls of said body cover having second openings for introducing fresh air into said body cover.

5. A motor vehicle according to claim 1, wherein:
said laterally spaced members of said seat frame being bent inwardly toward each other for contact with the knees of a rider on the motor vehicle.

* * * * *

UNITED STATES PATENT AND TRADEMARK OFFICE
CERTIFICATE OF CORRECTION

PATENT NO. : 4,781,264

DATED : November 1, 1988

INVENTOR(S) : Matsuzaki et al.

It is certified that error appears in the above-identified patent and that said Letters Patent is hereby corrected as shown below:

```
Column 2, line 51, after "XII-XII" change "o" to --of--;
         line 56, change "exteding" to --extending--.
Column 3, line 1, change "defined" to --define--;
         line 29, change "space" to --spaced--.
Column 5, line 6, after "smaller" insert a period.
Column 7, line 10 (claim 1, line 21), change "comprise" to --comprises--;
         line 15 (claim 1, line 26), after "main" insert --and--.
In the Abstract, line 11, change "an" to --and--.
```

Signed and Sealed this

Fourth Day of July, 1989

*Attest:*

DONALD J. QUIGG

*Attesting Officer*     *Commissioner of Patents and Trademarks*